(12) United States Patent
Sloo et al.

(10) Patent No.: US 7,907,152 B2
(45) Date of Patent: *Mar. 15, 2011

(54) FULL SCALE VIDEO WITH OVERLAID GRAPHICAL USER INTERFACE AND SCALED IMAGE

(75) Inventors: David Hendler Sloo, Menlo Park, CA (US); Ronald Alan Morris, San Francisco, CA (US); Peter T. Barrett, Palo Alto, CA (US); Jeffrey W. Fassnacht, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/760,225

(22) Filed: Apr. 14, 2010

(65) Prior Publication Data

US 2010/0194977 A1 Aug. 5, 2010

Related U.S. Application Data

(60) Continuation of application No. 11/183,612, filed on Jul. 18, 2005, now Pat. No. 7,705,860, which is a division of application No. 10/665,714, filed on Sep. 19, 2003, now Pat. No. 7,133,051.

(51) Int. Cl.
*G09G 5/00* (2006.01)
(52) U.S. Cl. ........................................................ 345/634
(58) Field of Classification Search .................. 345/629, 345/634
See application file for complete search history.

(56) References Cited

U.S. PATENT DOCUMENTS

| | | | |
|---|---|---|---|
| 4,639,765 A | 1/1987 | D'Hont |
| 5,455,632 A | 10/1995 | Ichihara |
| 5,459,528 A | 10/1995 | Pettitt |
| 5,847,771 A | 12/1998 | Cloutier et al. |
| 6,091,447 A | 7/2000 | Gershfeld |
| 6,288,752 B1 | 9/2001 | Saito et al. |
| 6,323,911 B1 | 11/2001 | Schein et al. |
| 6,466,220 B1 | 10/2002 | Cesana et al. |
| 6,522,774 B1 | 2/2003 | Bacus et al. |
| 6,538,663 B2 | 3/2003 | Kamei |
| 6,918,132 B2 | 7/2005 | Gargi |
| 7,001,413 B2 | 2/2006 | Butler |
| 7,234,937 B2 | 6/2007 | Sachdeva et al. |
| 2002/0039101 A1 | 4/2002 | Fernandez et al. |
| 2002/0053084 A1 | 5/2002 | Escobar et al. |

(Continued)

FOREIGN PATENT DOCUMENTS

CN 1139351 1/1997

(Continued)

*Primary Examiner* — Ryan R Yang
(74) *Attorney, Agent, or Firm* — Lee & Hayes, PLLC (57) ABSTRACT

The present disclosure relates to displaying full scale images with overlaid similar scaled images and a graphical user device in a display of a client device. The client device receives video streams of the full scale images and scaled images. The video streams are broadcast independent of one another, and a user of the client device may manipulate the format of the images of either or both streams, and/or place the scaled image on any portion of the full scaled image. The graphical user interface is placed so it does not obscure the scaled image. Alternatively a single video stream may be received by the client device. When a single video stream is received, the client device creates two video streams, one stream comprising full scale images and the other stream comprising scaled images. The full scale image is overlaid with the scaled image and the graphical user interface.

19 Claims, 7 Drawing Sheets

U.S. PATENT DOCUMENTS

| | | |
|---|---|---|
| 2002/0129365 A1 | 9/2002 | Kim et al. |
| 2003/0229894 A1 | 12/2003 | Okada et al. |
| 2004/0111526 A1 | 6/2004 | Baldwin et al. |
| 2004/0117819 A1 | 6/2004 | Yu |
| 2004/0117823 A1 | 6/2004 | Karaoguz et al. |
| 2005/0012759 A1 | 1/2005 | Valmiki et al. |
| 2005/0028201 A1 | 2/2005 | Klosterman et al. |
| 2006/0117343 A1 | 6/2006 | Novak et al. |

FOREIGN PATENT DOCUMENTS

| | | |
|---|---|---|
| CN | 1249613 | 4/2000 |
| EP | 0711079 | 5/1996 |
| WO | WO9414283 | 6/1994 |
| WO | WO9501056 | 1/1995 |

FULL SCALE VIDEO WITH OVERLAID GRAPHICAL USER INTERFACE AND SCALED IMAGE

RELATED APPLICATIONS

This is a continuation of and claims priority to U.S. patent application Ser. No. 11/183,612 filed Jul. 18, 2005 entitled "Full Scale Video with Overlaid Graphical User Interface and Scaled Image" by inventors David H. Sloo, Ronald Morris, Peter T. Barrett and Jeffrey Fassnacht, which is a divisional of, and claims priority to, U.S. patent application Ser. No. 10/665,714 filed on Sep. 19, 2003 entitled "Full Scale Video with Overlaid Graphical User Interface and Scaled Image" by inventors David H. Sloo, Ronald Morris, Peter T. Barrett and Jeffrey Fassnacht.

TECHNICAL FIELD

This disclosure relates to interactive television systems, and particularly, to user interfaces used in such systems.

BACKGROUND

Interactive television (ITV) is an evolving medium offering a user more enriched viewing experiences in comparison to previous television broadcasting mediums (i.e., radio frequency and cable television broadcasts). ITV makes use of graphical user interfaces (GUIs) with interactive menus that provide valuable information to users. Examples of such information include descriptions regarding programs, the time in which particular programs are displayed, and different variations such as languages in which a program may be viewed.

It is common for a user to invoke a GUI-based menu while watching a video program. Unfortunately, the menu is often distracting to the user's ability to continue watching the video program, as the user must mentally switch from viewing the video images to focusing on the GUI. In some cases, the GUI replaces the video program on the screen. Depicting the menu in place of the video program completely interrupts the user's ability to continue watching the video program, which typically continues to run in background.

In other cases, the GUI may be overlaid or displayed directly onto the video images. In this situation, however, the overlaid GUI usually obscures the video program, blocking out portions of the video images and thus interrupting the user's ability to view the video program while the GUI is present. In still other cases, the video images may be scaled to fit alongside a displayed GUI. However, this technique typically involves resizing the video images to properly fit an allocated section on the screen along with the GUI. In other words, a predetermined format defines allocated sections on the screen for the user interface and the video images when they are simultaneously displayed. Also, when full scale video images are switched to scaled images, distortion may occur. For example, the user may have chosen to view a movie in letterbox format, but properly presenting the GUI with the scaled video images might require sizing the video images to a format different than letterbox format, which distorts the video images.

In the above described and other techniques, the video images are interrupted, obscured, and/or distorted, affecting the user's viewing experience when the GUI is called up. Although the user may desire to call up the graphical user interface, the user may be hesitant to do so in order to avoid missing part of the video program.

SUMMARY

The system and methods described herein provide a graphical user interface (GUI) that minimizes distraction to the viewing experience of watching ongoing programming while the GUI is present. For particular implementations, a full scale image is displayed on a screen. A visually similar, but scaled image and a GUI are overlaid on the full scale image. The scaled image and the GUI are placed on the screen so that the GUI does not obscure vision of the scaled image. In this manner, while the GUI obstructs viewing of the full scale image, it does not obstruct viewing of the scaled image.

In certain implementations, a user may perform an action to format the scaled image for better viewing without affecting the format of the full scale image. Alternately, the scaled image may automatically be formatted for better viewing without affecting the format of the full scale image. The user may also initiate actions on the graphical user interface that changes or provides new information displayed on the graphical user interface.

DETAILED DESCRIPTION

The following disclosure concerns techniques for presenting a graphical user interface (GUI) during play of video programs. The techniques will be described in the exemplary context of television (e.g., cable TV, ITV, satellite TV, etc), where a program menu or guide is invoked while video programs continue to be displayed on screen.

In the described implementation, a GUI-based menu is overlaid atop a full scale video image. A scaled version of the video image is also depicted simultaneously with the menu and overlaid on the full scale video image. The overlaid menu and scaled video image blocks portions of the full video scale image; however, a user views an unobstructed and non-distorted scaled video image similar in appearance to the full scale video image. The menu may be used to display information related to broadcast programming and responsive to actions initiated by the user.

Although there are many possible implementations, the techniques are described in the context of an interactive TV environment, which is described first in the next section.

Exemplary Environment

Figure 1:
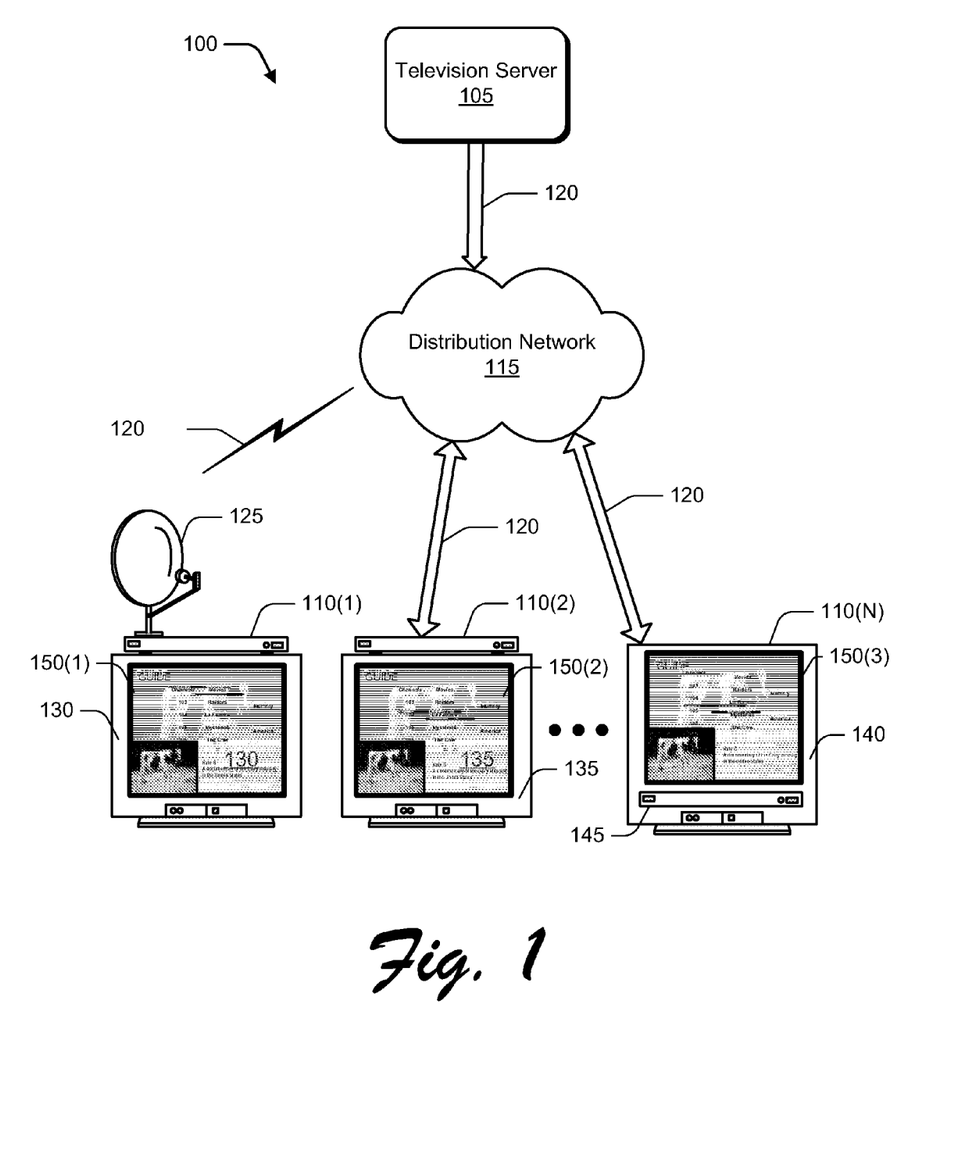
FIG. 1 is a block diagram illustrating an exemplary system that supports transmitting and receiving multiple video streams.

FIG. 1 shows an exemplary system 100 that provides identical video streams. System 100 is a television entertainment system that facilitates distribution of content and program data to multiple viewers. The system 100 includes a television server 105, and multiple client devices 110(1), 110(2) . . . 110(N) coupled to the television server 105 via a distribution network 115. Exemplary system 100 may include any number of television servers and client devices. Although exemplary system 100 describes cable and/or satellite transmission, it is contemplated that other modes of transmission, such as Internet protocol television (IPTV), may be used to transfer video data from source (e.g., server) to destination (e.g., client).

Television server 105 serves various media content such as television programs, movies, video-on-demand, and advertisements. The content may reside at the television server 105 or be received from one or more different sources (not shown). Further, television server 105 may provide other information to client devices 110, such as electronic program guide (EPG) data for program titles, ratings, characters, descriptions, genres, actor names, station identifiers, channel identifiers, schedule information, and so on.

Television server 105 processes and transmits the media content over distribution network 115. Distribution network 115 may include a cable television network, RF, microwave, satellite, and/or data network such as the Internet, and may also include wired or wireless media using any broadcast format or broadcast protocol. Additionally, distribution network 115 can be any type of network, using any type of network topology and any network communication protocol, and may be represented or otherwise implemented as a combination of two or more networks.

Client devices 110 may be implemented in a number of ways. A particular client device 110 may be coupled to any number of televisions and/or similar devices that may be implemented to display or otherwise render content. Similarly, any number of client devices 110 may be coupled to a television.

For example, the client device 110(1) receives content including video stream output 120 from a satellite-based transmitter via a satellite dish 125. Content received by satellite dish 125 may be transmitted directly from television server 105 or transmitted from distribution network 115. Client device 110(1) is also referred to as a set-top box or a satellite receiving device. Client device 110(1) is coupled to a television 130 for presenting media content received by the client device 110(1) (e.g., audio data and video data), as well as a graphical user interface (GUI). Alternatively, radio frequency (RF) antennas may be used in place of satellite dish 125 to receive content.

Client device 110(2) is coupled to receive content from distribution network 115 and provide the received content to a television 135. Client device 110(N) is an example of a combination television 140 and integrated set-top box 145. In this example, the various components and functionality of a set-top box are incorporated into a television, rather than using two separate devices. The set-top box incorporated into the television may receive content signals via a satellite dish (similar to satellite dish 125) and/or connected directly to distribution network 115. In alternate implementations, client devices 110 may receive content signals via the Internet or any other broadcast medium.

Television server 105 is configured to transmit a single video stream or two video streams. The video stream(s) are shown as video stream 120. Video stream 120 may include video images from the media content provider. When two video streams are transmitted, it is contemplated that one video stream is a compressed version of the other (full scale) video stream. The compressed video stream makes use of fewer transmission resources than the full scale video stream. In other words, the compressed video stream makes use of less bandwidth resources when broadcasted to client devices. The compressed video stream provides scaled video images that are similar in appearance to the full scale video images of the full scale video stream.

The scaled video images, along with a GUI, are overlaid onto full scale images at client devices 110. Exemplary display layouts are shown as 150(1) on television 130, 150(2) on television 135, and 150(3) on television 140. These display layouts are described in more detail in the next section.

User Interface

Figure 2A:
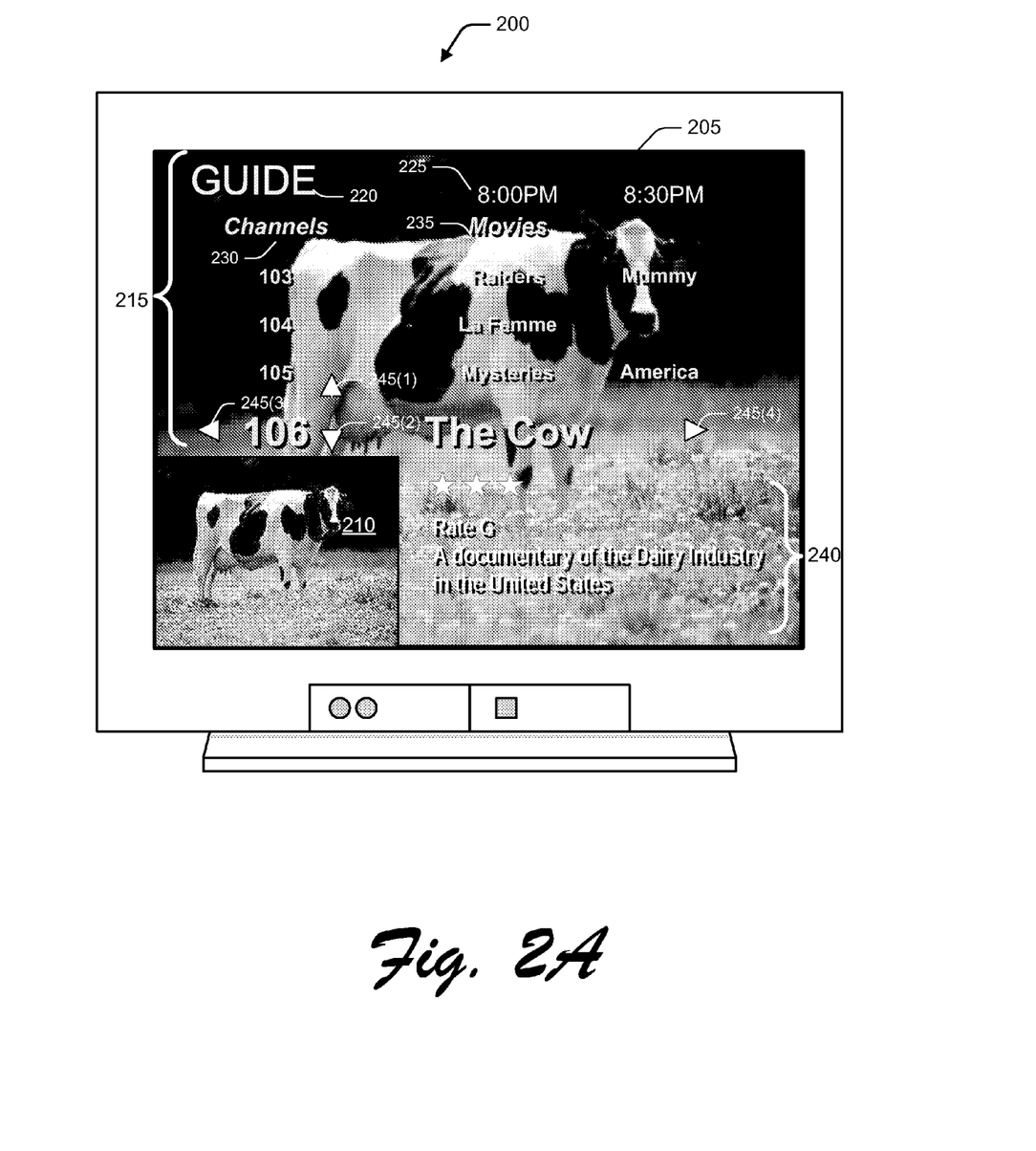
FIG. 2A illustrates an exemplary display screen in which a graphical user interface and a scaled video image are overlaid onto a full scale video image according to a first layout.

FIG. 2A shows an exemplary screen 200 that may be presented on a television screen, computer monitor, or other type of display implemented at the client device 110. The screen display is similar to the display layouts 150 shown in FIG. 1.

Screen display 200 includes a full scale image 205, a scaled image 210, and a graphical user interface (GUI) 215. The full scale image 205 is representative of a full scale video stream received at the client device 110. The full scale image 205 occupies the entire area of the screen. The scaled image 210 represents video images of a scaled (and in certain cases compressed) video stream received at the client device 110, which is an undistorted scaled version of the full scale video stream represented by image 205. The scaled image 210 is visually similar to the full scale image 205.

In this example, the scaled image 210 is placed in the lower left corner of the screen 200. Alternatively, the scaled image 210 may be placed in other sections of screen 200. Considering that most users are accustomed to viewing or "reading" information from left to right and from top to bottom, information and/or sub images (i.e., scaled image 200) may be laid out in order of importance from top left to bottom right of screen 200. The layout may be changed to suit the particular application of the GUI 215, the particular format of video as represented by images 205 and/or 210, or a target audience. For example, a target audience that reads text right-to-left might benefit from a different layout.

The GUI 215 is overlaid onto full scale image 205. GUI 215 may provide various pieces of information presented in various layouts. GUI 215 is intended to provide one example of a countless number of graphical interface menus. GUI 215 is placed alongside scaled image 210 in a manner that does not obscure the scaled image 210. Both GUI 215 and scaled image 210 are overlaid onto and partly obscure full scale image 205.

In this example, GUI 215 is a program guide 220 that includes a timeline 225, channel information beneath a "channels" heading 230, and movie information beneath a "movies" heading 235. A user may select a particular entry (i.e., movie) from the programming guide 220, and a summary 240 describing the movie of interest is presented. The summary may include a critic and a censor rating, along with a brief description of the movie. In this example, the user has selected the movie "The Cow" on channel "106" as exhibited by the enlarged title and channel number in the guide 220. The summary 240 presents information about the movie "The Cow".

Screen 205 comprises a set of graphical user interface arrows 245(1), 245(2), 245(3), and 245(4) to allow a user to navigate through the GUI 215. In this example, arrows 245(1) and 245(2) allow a user to scroll through the channels 230; and arrows 245(3) and 245(4) allow the user to scroll through the timeline 225. Graphical user interface arrows 245 are configured to provide input from the user back to either the television server 105 or client device 110 of FIG. 1, or to another device and/or system, such as a "head in" defined as a TV operator's operation center, providing the graphical user interface 215.

While the menu 215 is present, the scaled video image 210 is presented atop the full scale image 205 and both video images continue to display the ongoing program. Since the full scale image 205 is similar image to scaled video image 210, the user is able to watch the unobscured, reduced scaled image 210 while the menu 215 is present, thereby minimizing interruption to the ongoing program. The user is able to make an easy and intuitive visual transition from full-screen unobscured video to an interactive mode in which a reduced video continues playing. The scaled video images continues to provide unobscured video images, yet leaves screen 200 free for interactive user interface elements (i.e., GUI 215).

Figure 2B:
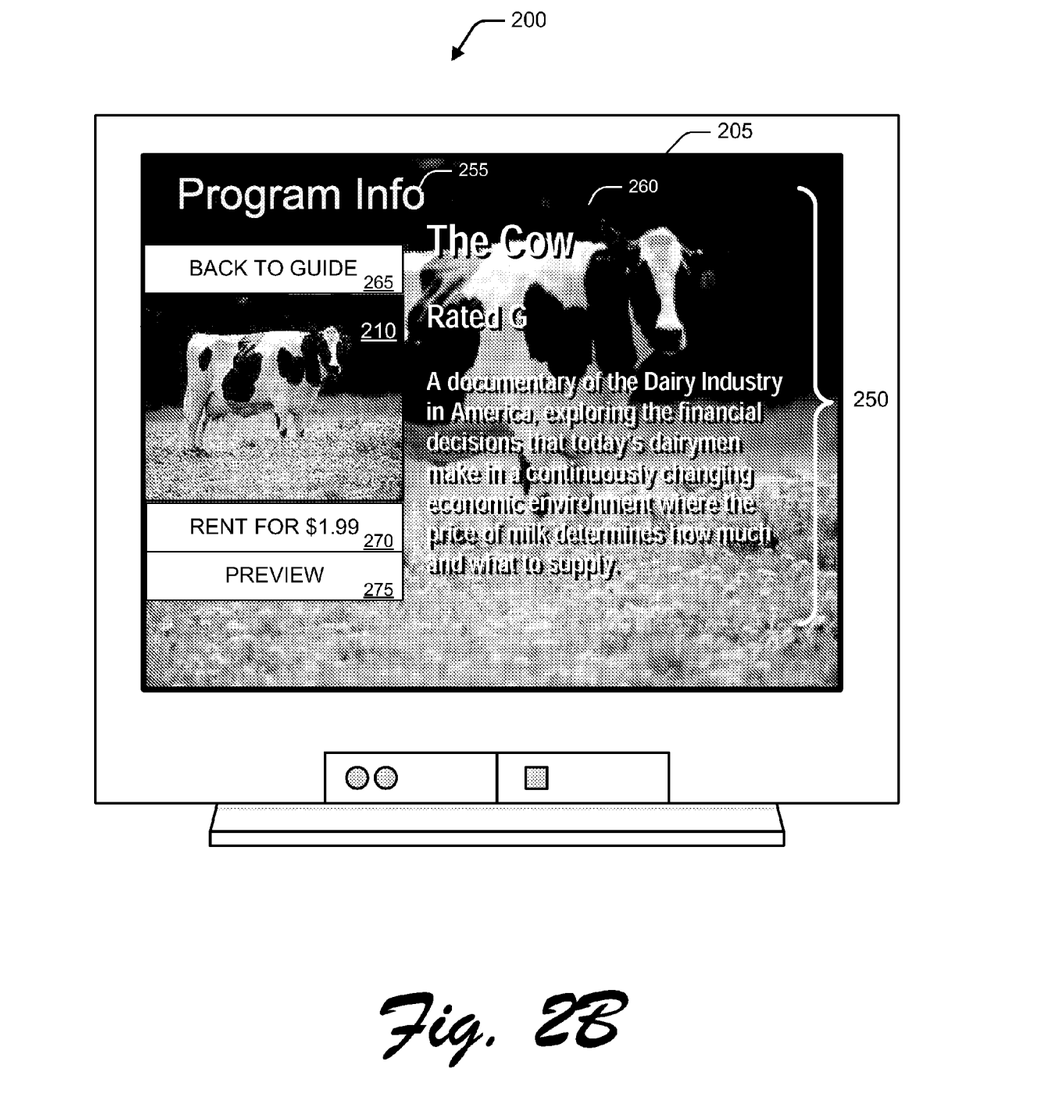
FIG. 2B illustrates another exemplary display screen with a second layout that is different than the first layout depicted in FIG. 2A.

FIG. 2B shows a screen 200 with an alternative exemplary display output. Full scale image 205 continues to occupy the entire screen 200 as shown in FIG. 2A; however, in this example scaled image 210 has been moved. This illustrates that scaled video image 210 is not limited to any particular portion of screen 200, but may be placed anywhere on screen 200. Scaled image 210 may also be in a different format than full scale image 205 in order to maximize user viewing. For example, if full scale image 205 is in a letterbox format, scaled image 210 is displayed in a format that may be better viewed by the user.

A different GUI 250 is presented to the user. In this particular example, GUI 250 describes program information 255. The particular program information relates to the movie "The Cow" which provides a summary 260 that includes the title, censor rating, and a more detailed summary than presented in summary 240. Further, GUI 250 provides interactive buttons for the use to choose from. In particular, button 260 allows the user to go back to the guide, button 265 allows the user to order the movie, and button 270 provides a preview of the movie.

Television Server

Figure 3:
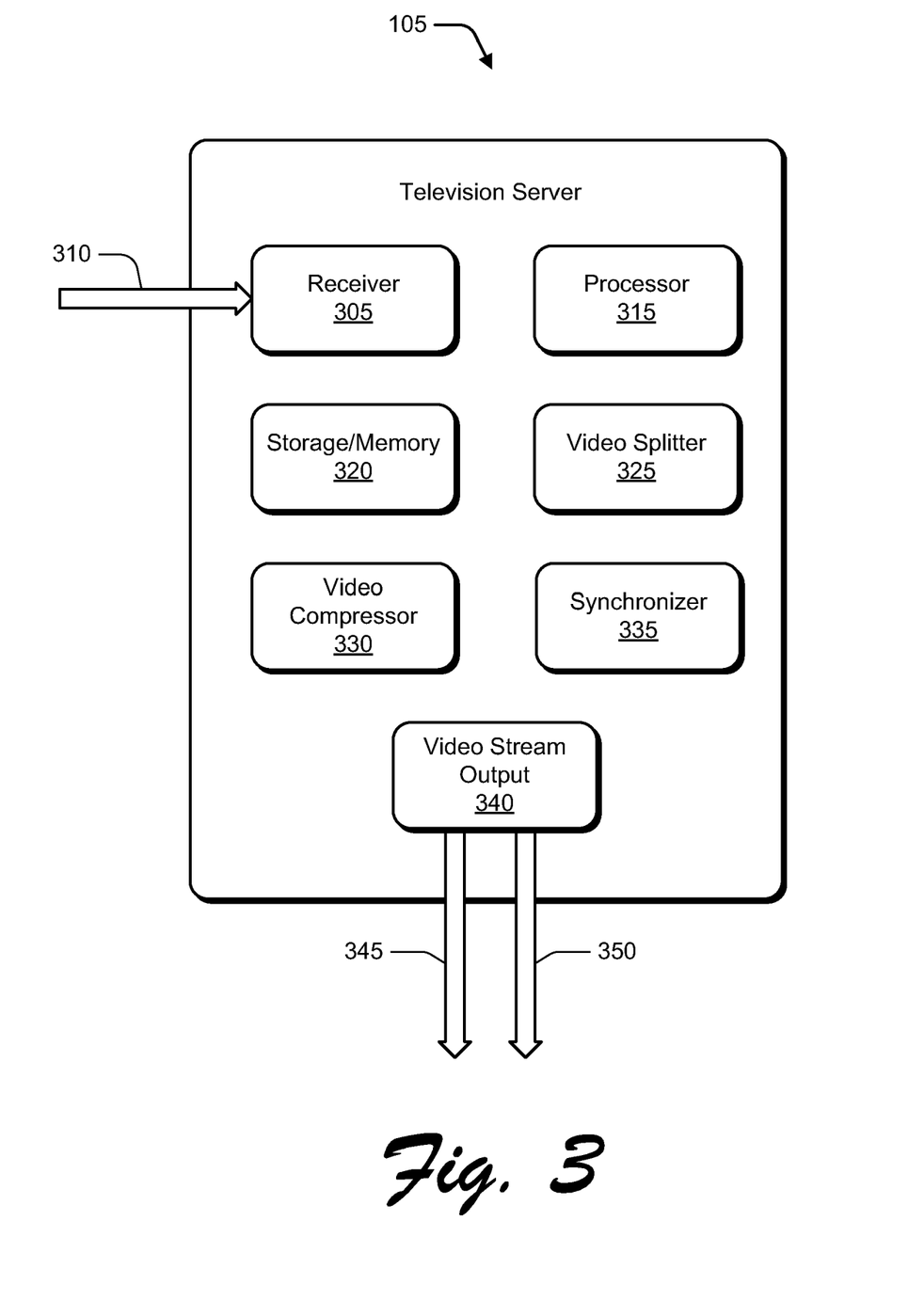
FIG. 3 is a block diagram illustrating an exemplary television server that provides one or more video streams.

FIG. 3 shows an exemplary television server 105 that provides one or more video streams to the client devices. Such video streams contain the full scale image 205 and the scaled image 210 of FIG. 2A and FIG. 2B. Furthermore, the television server 105 may broadcast GUI 215 of FIG. 2A and GUI 250 of FIG. 2B. Television server 105 may be implemented as part of a larger server architecture that provides a variety of television and Internet based services, where the larger server architecture is part of a "head end". Television server 105 may be compatible with one of various standards including the Microsoft® Corporation's "TV Server" server.

Television server 105 includes a receiver component 305 which may be configured as an input/output unit. Receiver component 305 receives media content 310 that includes audio, video data, and GUI data (i.e., data related to full scale image 205, scaled image 210, and GUIs 215, 250). Media content 310 may be received from a media content provider or some other source.

A processor 315 is included in television server 105. The processor 315 may perform the functions of initializing/monitoring other components in television server 105, processing various applications/programs, and fetching data and instructions.

Television server 105 includes a storage/memory component 320 configured to store various applications/programs, an operating system, and content such as media content 310. Storage/memory component 320 may include random access memory (RAM) and read only memory (ROM). Furthermore, storage/memory component 320 may be configured as an optical, magnetic or some other read/write storage medium.

It is contemplated that media content 310 includes video content that comprises a single video stream. Television server 105 includes a video splitter component 325 that receives the single video stream and splits it into two video streams.

One of the two video streams is received by a video compressor component 330. Video compressor component 330 may be configured to use a lossy compression algorithm to reduce video images of the particular video stream that is received. The lossy compression algorithm particularly drops quality information from the video images such as eliminating some lines from the compressed video. Since the compressed video images are displayed as a scaled version of the uncompressed images at a client device, a user is not aware of any degradation in video image quality from the compression: video images merely appear smaller. A video stream of compressed images (compressed video stream) is produced by video compressor component 330.

A synchronizer component 335 may be used to synchronize images of the compressed video stream along with images of the uncompressed (full scale) video stream. The synchronizer component 335 provides that the same images, one scaled and the other full scale, are displayed at the same time. It is contemplated that synchronizer component 335 may also synchronize audio content and other media content (e.g., subtitle information) along with the images of the compressed and full scale video streams. Separate media content streams (i.e., distinct audio and video streams) may be sent from television server 105; however, in particular embodiments, audio and video streams may be interleaved with one another to create a single media stream that includes video and audio content.

A video stream output component 340 is included in television server 105 to output compressed video stream 345 and a full scale video stream 350. The images of either compressed video stream 345 and/or full scale video stream 350 may be altered (i.e., image format changed) without affecting the images of the other video stream. For example, images of the compressed video stream 345 may be transmitted in letter box format while images of the full scale video stream 350 may be transmitted in another format.

Video stream output component 340 may provide output directly to broadcast network 115 of FIG. 1 or may output to other servers, devices, and sub-networks within a head end prior to broadcast to client devices. In certain embodiments, a single video stream is outputted from the video stream output component 340, instead of the two video streams 345 and 350. As discussed further below, in the case of a single video stream, a receiving client device receives and splits the single video stream into two video streams.

Client Device

Figure 4:
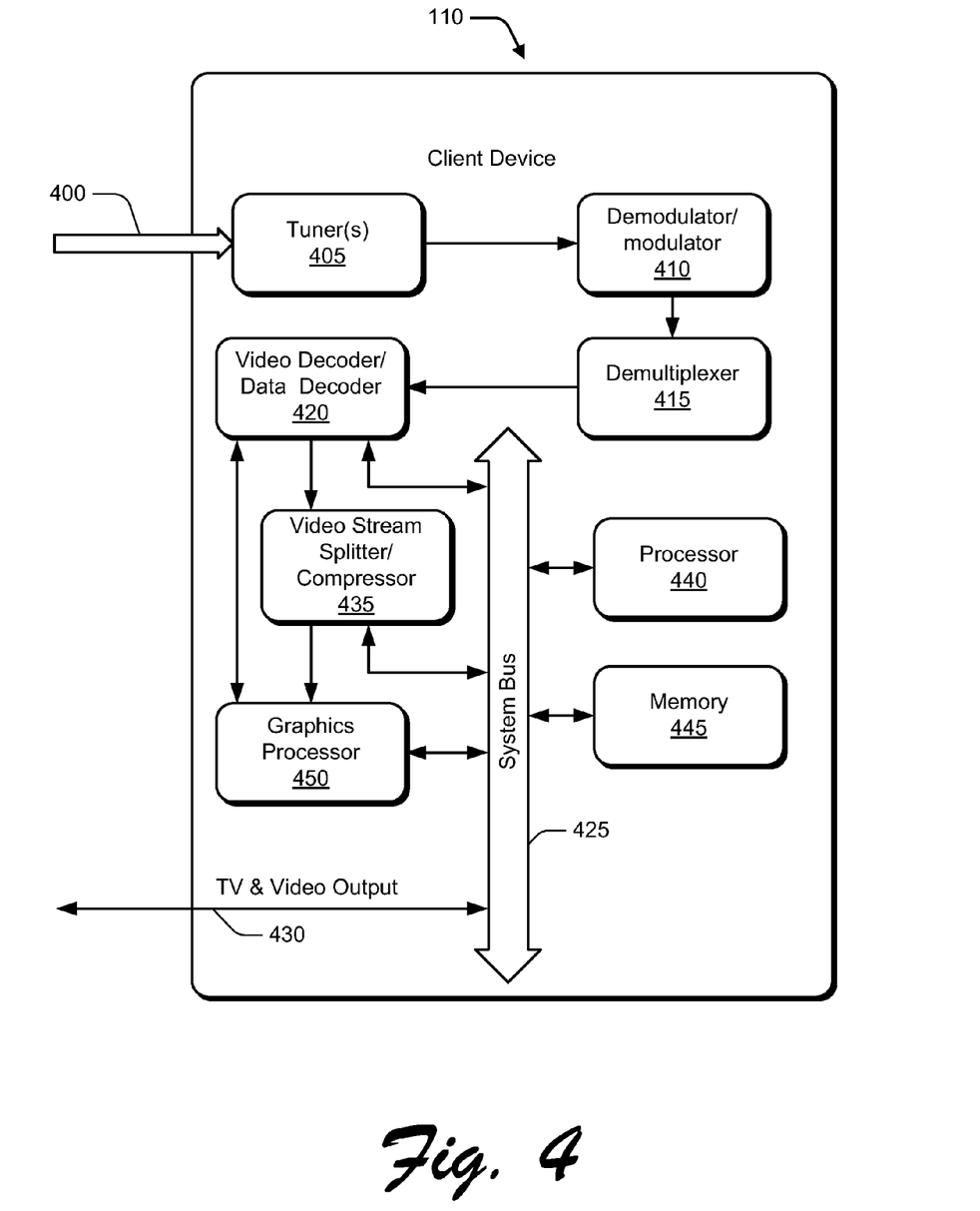
FIG. 4 is a block diagram illustrating an exemplary television client device that receives one or more video streams.

FIG. 4 shows an exemplary client device 110 that receives the one or more video streams served by the television server 105. In certain embodiments, the client device 110 receives two video streams (i.e., video streams 345 and 350 of FIG. 3). In other embodiments, the client device 110 receives a single video stream. Client device 110 is configured to receive data content 400 that includes the compressed video stream 345 and the full scale video stream 350 of FIG. 3, or a single video stream. When two video streams are received, one stream will contain full scale video images that represent full scale image 205, and the other video stream will contain scaled video images that represent scaled image 210 of FIG. 2A and FIG.

2B. Furthermore, client device 110 may be configured to receive GUI data that represents GUI 215 of FIG. 2A and GUI 250 of FIG. 2B.

A tuner 405 receives signals representing the data content 400. Tuner 405 may comprise a broadcast in-band tuner (not shown) configured to receive signals from a particular channel; an out-of-bound tuner (not shown) configured to facilitate the transfer of data from a head end to the client device 110; and a return path tuner (not shown) configured to send data from the client device 110.

A demodulator/modulator component 410 of client device 105 converts analog signals from tuner 405 to digital bit streams. The analog signals and the digital bit streams include video streams. The digital bit streams are received at a demultiplexer component 415. The digital bit streams comprise a number of uniquely identified data packets that include a packet identifier (PID) which identifies a particular format of data including video and audio data.

The demultiplexer component 415 examines the PID and forwards a data packet associated with the PID to a specific decoder. In particular cases, a data packet containing video data is sent to a video decoder/data decoder component 420. The video data represents the single stream of video or the compressed video stream 345 and full scale video stream 350 of FIG. 3. In the case when two video streams (compressed and full scale) are received by client device 110, the video decoder/data decoder component 420 transforms the data packet containing the video data into a sequence of scaled and full scale images which are sent over a system bus 425. The system bus 425 in turn sends the images to a TV & Video Output 430 which is connected to a monitor or a television.

In a particular embodiment, when a single video stream is sent to client device 110, the data packet containing the video data is transformed into a sequence of images which are sent to a video stream splitter/compressor component 435 which creates scaled images and full scale images. The scaled images may or may not be compressed by the video stream splitter/compressor component 435. It is contemplated that other embodiments may place the video stream splitter/compressor 435 or similar component at different locations within the data processing components described above. For example, the digital bit stream may be split before received by demodulator/modulator component 410; or the data packet containing video data may be split before received by the video decoder/data decoder component 415.

Processor component 440 is configured to communicate over the system bus 425, and performs functions that include initializing various client device 110 components, processing various applications, monitoring hardware within client device 110, and fetching data and instructions from a memory component 445. Processor component 440 may also perform the function of synchronizing full scaled and scaled video images.

Memory component 445 may comprise RAM used to temporarily store data that is processed between processor component 440 and various hardware components as described above. Memory component 445 may also include ROM to store instructions. Further, memory component 445 may include read/write storage devices such as hard disks and removable medium.

User interface or graphical interface menu data may be sent to client device 110 as part of data content 400. Tuner 405 receives the graphical interface menu data that is part of data content 400. Demodulator/modulator component 410, demultiplexer component 415 and video decoder/data decoder 420 may process the graphical interface menu data. In certain embodiments components that provide similar functionality may be used to process the graphical interface menu data. Processed graphical interface menu data is sent to a graphics processor component 450 which renders a graphical interface menu (graphical user interface) to be overlaid onto video images. The graphical interface menu is sent to system bus 425 which in turn sends the graphical interface menu to TV & Video Output 430 which is connected to a monitor or television such as televisions 130, 135, and 140 of FIG. 1. The monitor or television provides a screen that displays video images with an overlaid scaled video image and the overlaid graphical interface menu. Graphical interface menu data may also be generated entirely within the client device 110, and not sent as part of the data content 400.

Operation

Figure 5:
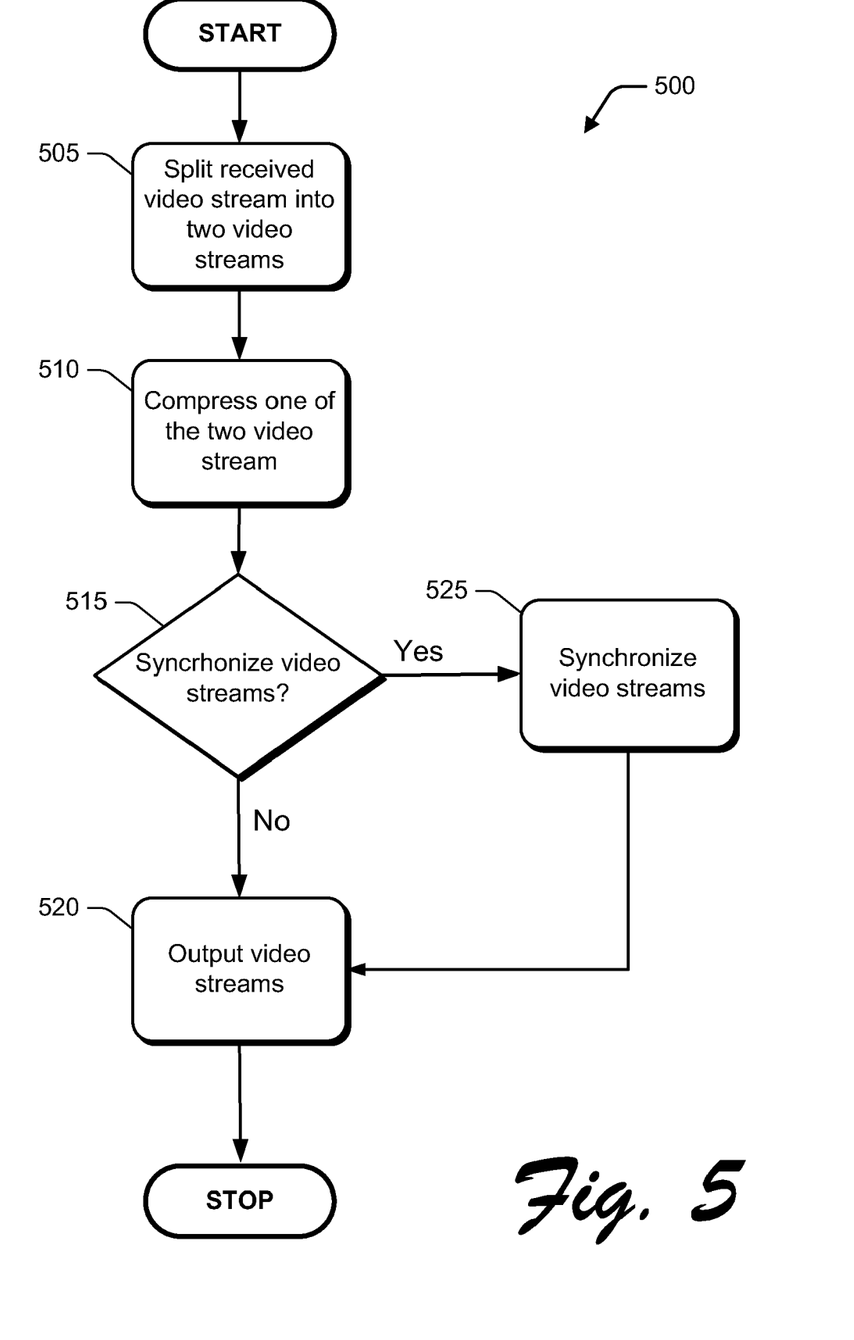
FIG. 5 is a flowchart illustrating an exemplary process of providing video streams of full scale and scaled images.

FIG. 5 shows an exemplary process 500 of providing video streams that may be used in an output display that provides a full scale image overlaid with a visually similar, but scaled image and GUI, such as a program guide or other menu. Process 500 may be incorporated at television server 105 of FIG. 2 or client device 110 of FIG. 3. It is contemplated that the blocks described below of process 500 may be operations that are implemented in hardware, software, and/or a combination.

At block 505, a video stream is received and split into two identical video streams. This may be done through an analog RF splitter, or digital information related to images of the received video stream may be copied from the original video stream and creating a duplicate video stream. The video splitting may be performed by the video splitter component 225 of television server 105 shown in FIG. 2, or the video stream splitter/compressor 335 of client device 110 as shown in FIG. 3.

At block 510, one of the video streams is compressed. As described above, the compressed video stream represents the scaled image 210 displayed on screen 200 of FIGS. 2A and 2B. This compression may be performed using one of various lossy compression techniques by the video compressor 330 of television server 105 as shown in FIG. 3, or the video stream splitter/compressor 435 of client device 110 as shown in FIG. 4.

At block 515, a determination is made whether the two video streams are to be synchronized. When block 505 or block 510 occurs, or some other process involving one and/or both of the video streams, one stream may be delayed relative to the other. The determination process of block 515 may be performed by processor component 315 of television server 105 shown in FIG. 3, or processor component 440 of client device 110 shown in FIG. 4.

At block 520, if the streams need not be synchronized (i.e., the "No" branch from block 515), the video streams are output. This operation may be performed as an output function of television server 105 of FIG. 3, and particularly by video stream output component 340 of television server 105. Block 520 may also be performed as a function of client device 110 of FIG. 4 where the video streams are output to system bus 425 and out to TV & Video Output 430 of FIG. 4.

At block 525, if the streams need to be synchronized (i.e., following the "Yes" branch of block 515) the video streams are synchronized in order for the same images to be streamed and presented with one another. At block 525 may be performed by synchronizer 335 of television server 105 as shown in FIG. 3, processor component 440 of FIG. 4 as described above. The synchronized video streams are then output by block 520.

With the two video streams, one having scaled images and the other having full scale images, a user is able manipulate images of one stream independent of manipulating the images of the other stream. In other words, as described above and shown in FIGS. 2A and 2B, a user may modify the scale image 210 to a format that provides better user viewing without modifying full scale image 205.

Figure 6:
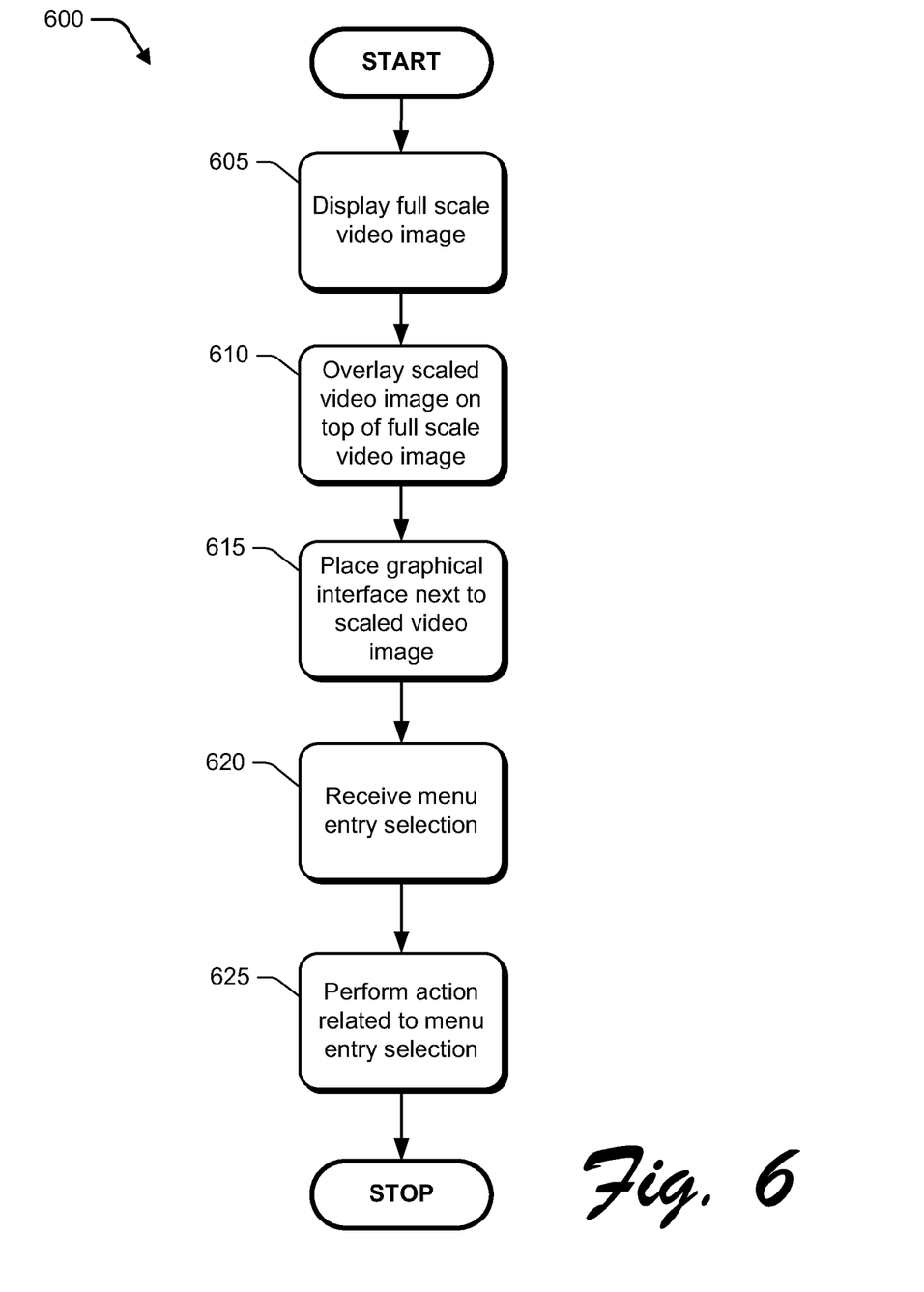
FIG. 6 is a flowchart illustrating an exemplary process of presenting a graphical user interface on a screen.

FIG. 6 shows an exemplary process 600 of displaying a graphical user interface (GUI) using the video streams of process 500 of FIG. 5. In particular the GUI and scaled images are overlaid onto full scale images. Process 600 may be particularly implemented for screen 400 as shown in FIG. 4.

At block 605, a provision is made for display of a full scale image which is part of a full scale video stream as described above. The full scale video image occupies the entire screen or display as illustrated by full scale image 205 described above in FIGS. 2A and 2B.

At block 610 a scaled video is displayed or overlaid onto a scaled video image on top of the full scale video image. The scaled video image and the full scale video image are similar in appearance. The scaled video image is illustrated as scaled image 210 of FIGS. 2A and 2B above. The scaled video image may be placed in any location on the full scale image. Placement may be predicated on accommodating the user, ease of viewing, and user choice.

At block 615 a GUI is placed (overlaid) onto the full scale video image obscuring the full scale video image, but not obscuring the scaled video image. The GUI is illustrated as GUI 215 of FIG. 2A and GUI 250 of FIG. 2B.

At block 620 a user may perform an action, such as menu selection, on the GUI. Actions may include choosing a menu item, scrolling through items provided in the GUI, and calling up menus and/or other interfaces.

At block 625 action or actions of block 620 may be performed such as instructing a device such as television server 105 of FIG. 3 or client device 110 of FIG. 4 to provide new (e.g., modified) information to the GUI.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   receiving video stream data and a graphical user interface;
   splitting the video stream data to create two video streams of data, a video stream of reduced scale images and a video stream of full scale images;
   determining whether the video stream of reduced scale images and the video stream of full scale images should be synchronized;
   delaying either the video stream of reduced scale images or the video stream of full scale images relative to one another when it is determined that the video stream of reduced scale images and the video stream of full scale images should not be synchronized; and
   outputting the video stream of reduced scale images, the video stream of full scale images, and the graphical user interface to a display device, the video stream of reduced scale images including reduced scale images corresponding to full scale images of the video stream of full scale images.

2. The method of claim 1, wherein the reduced scale images and the graphical user interface are overlaid onto the full scale images.

3. The method of claim 2, wherein a user determines where the reduced scale images are overlaid onto the full scale images.

4. The method of claim 1, wherein the splitting comprises compressing the video stream data.

5. The method of claim 4, wherein the compressing is performed by a compression algorithm.

6. The method of claim 1, further comprising formatting the reduced scale images without affecting a format of the full scale images.

7. The method of claim 1, wherein the reduced scale images are placed along the left side of the full scale images.

8. One or more computer-readable media having computer-executable instructions that, when executed by a processor, cause the processor to perform operations comprising:
   separating from media content, a video stream including reduced scale images, a video stream comprised of full scale images, and a graphical user interface; and
   displaying the full scale images on a screen, the reduced scale images and the graphical user interface being overlaid onto the full scale images.

9. The one or more computer-readable media of claim 8, wherein the full scale images occupy an entire area of the screen.

10. The one or more computer-readable media of claim 8, wherein the full scale images are a different format than the reduced scale images.

11. The one or more computer-readable media of claim 8, wherein the reduced scale images are compressed images of the full scale images.

12. The one or more computer-readable media of claim 8, the operations further comprising synchronizing identical images of the full scale images and the reduced scale images.

13. The one or more computer-readable media of claim 8, the operations further comprising:
   accepting actions from a user to modify the graphical user interface; and
   processing the actions to modify the graphical user interface.

14. The one or more computer-readable media of claim 8, the operations further comprising receiving instructions from a user to provide a different graphical user interface.

15. A device comprising:
   a video splitter component to split a received video stream into a first video stream and a second video stream;
   a video compressor component to compress the first video stream into a compressed video stream comprising reduced scale images, the second video stream being an uncompressed video stream comprising full scale images, the reduced scale images being manipulated at least in any portion or location of the full scale images; and
   a synchronizer component to synchronize the reduced scale images of the compressed video stream with the full scale images of the uncompressed video stream when it is determined that synchronization should occur.

16. The device of claim 15, further comprising a video output component to output the synchronized compressed video stream and uncompressed video stream.

17. The device of claim 16, wherein the video output component is further to overlay a graphical user interface onto the full scale images.

18. The device of claim 16, wherein the video output component is further to overlay the reduced scale images onto the full scale images.

19. The device of claim 15, wherein either the reduced scale images or the full scale images are synchronized with other media data.

* * * * *